(12) United States Patent
Tamura et al.

(10) Patent No.: US 10,029,219 B2
(45) Date of Patent: Jul. 24, 2018

(54) MICROBUBBLE GENERATING DEVICE AND CONTAMINATED WATER PURIFYING SYSTEM PROVIDED WITH MICROBUBBLE GENERATING DEVICE

(71) Applicant: EARTH RE PURE INC., Amagasaki-shi (JP)

(72) Inventors: Iwao Tamura, Amagasaki-shi (JP); Kazuyoshi Adachi, Kobe-shi (JP)

(73) Assignee: EARTH RE PURE INC. (JP)

( * ) Notice: Subject to any disclaimer, the term of this patent is extended or adjusted under 35 U.S.C. 154(b) by 0 days.

(21) Appl. No.: 15/031,061

(22) PCT Filed: Oct. 23, 2014

(86) PCT No.: PCT/JP2014/078208
§ 371 (c)(1),
(2) Date: Apr. 21, 2016

(87) PCT Pub. No.: WO2015/060382
PCT Pub. Date: Apr. 30, 2015

(65) Prior Publication Data
US 2016/0236160 A1    Aug. 18, 2016

(30) Foreign Application Priority Data

Oct. 23, 2013    (JP) ................................. 2013-219791

(51) Int. Cl.
*B01F 3/04* (2006.01)
*C02F 1/24* (2006.01)
(Continued)

(52) U.S. Cl.
CPC ........ *B01F 5/0428* (2013.01); *B01D 21/0084* (2013.01); *B01F 3/04113* (2013.01);
(Continued)

(58) Field of Classification Search
None
See application file for complete search history.

(56) References Cited

U.S. PATENT DOCUMENTS 4,110,210 A * 8/1978 Degner ................. B03D 1/247
    209/164
4,132,838 A    1/1979 Kreuer et al.
(Continued)

FOREIGN PATENT DOCUMENTS

CN    1972738 A    5/2007
DE    3211906 C1 * 12/1988
(Continued)

OTHER PUBLICATIONS

International Search Report; PCT/JP2014/078208; International Filing Date: Oct. 23, 2014; 1 pg.
(Continued)

*Primary Examiner* — Thomas M Lithgow
(74) *Attorney, Agent, or Firm* — Schmeiser, Olsen & Watts, LLP

(57) ABSTRACT

A microbubble generating device that is capable of generating microbubbles from contaminated water is provided. The microbubble generating device 10 according to the present invention includes a liquid flow path 11 through which a pressurized liquid flows, a discharge path 12 through which generated microbubbles and a liquid are discharged, a throat part 13 that connects the liquid flow path 11 and the discharge path 12, and that has a flow path area smaller than the area of the liquid flow path 11 or the discharge path 12, and a gas supply path 14 for supplying a gas into the liquid flow path 11 or the throat part 13, wherein the gas supply path 14 has an exit end 143 that opens toward the downstream side of the liquid flow.

2 Claims, 4 Drawing Sheets

(51) Int. Cl.
*B01F 5/04* (2006.01)
*B01D 21/00* (2006.01)

(52) U.S. Cl.
CPC ............ *B01F 3/04503* (2013.01); *C02F 1/24* (2013.01); *B01F 2005/0448* (2013.01); *B01F 2215/0052* (2013.01)

(56) References Cited

U.S. PATENT DOCUMENTS

| | | | | |
|---|---|---|---|---|
| 4,477,341 A | * | 10/1984 | Schweiss | B01F 3/0451 209/170 |
| 5,514,267 A | | 5/1996 | Machiya et al. | |
| 2007/0095937 A1 | | 5/2007 | Noguchi et al. | |
| 2010/0032354 A1 | | 2/2010 | Uematsu | |
| 2012/0206993 A1 | | 8/2012 | Casper | |
| 2013/0207283 A1 | * | 8/2013 | Rabe | B01D 17/0205 261/74 |

FOREIGN PATENT DOCUMENTS

| | | |
|---|---|---|
| JP | H0693991 B2 | 11/1994 |
| JP | H106692 A | 3/1998 |
| JP | 4298824 B | 7/2009 |
| JP | 2011240211 A | 12/2011 |
| JP | 2011120974 A | 6/2013 |
| RU | 118878 U1 | 8/2012 |
| SU | 1321691 A1 | 7/1987 |

OTHER PUBLICATIONS

Office Action dated Mar. 10, 2017 for CN patent application No. 201480056414.4.
Extended European Search Report for European Application No. 14855396.9, dated Jun. 19, 2017.
Office Action dated Oct. 17, 2017 for KR Application No. 10-2016-7013032.
Russian Office Action dated May 29, 2018 for Application No. 2016118035/05(028328).

* cited by examiner

MICROBUBBLE GENERATING DEVICE AND CONTAMINATED WATER PURIFYING SYSTEM PROVIDED WITH MICROBUBBLE GENERATING DEVICE

CROSS-REFERENCE TO RELATED APPLICATIONS

This application claims priority to PCT Application No. PCT/JP2014/078208, having a filing date of Oct. 23, 2014, based on JP2013-219791 having a filing date of Oct. 23, 2013, the entire contents of which are hereby incorporated by reference.

FIELD OF TECHNOLOGY

The following relates to a microbubble generating device, and a contaminated water purifying system provided with a microbubble generating device.

BACKGROUND

A liquid containing microscopic air bubbles, which are called microbubbles, having a diameter of 0.5 mm or less has heretofore been used in different fields, and various devices for generating microbubbles in a liquid have been proposed. The microbubble generating device comprises a mixer provided with a venturi tube. In the mixer, a gas is drawn in downstream of the throat part of the venturi tube to generate air bubbles, and the liquid and the air bubbles are delivered through a pipeline connected downstream of the mixer to a redistributor while the air bubbles are dissolved in the liquid. The venturi tube of the redistributor accelerates the liquid and air bubbles again, and a jet flow with which microbubbles are mixed is injected from a nozzle tip provided downstream of the redistributor.

SUMMARY

Technical Problem

Microbubbles rise in a liquid with contaminants, etc., adhered thereto. Such a property of microbubbles has recently gathered attention, and attempts have been made to purify contaminated water by allowing contaminants to adhere to microbubbles generated by a microbubble generating device and allowing the microbubbles with contaminants adhered thereto to rise. In relation to the attempts, to more efficiently allow contaminants to adhere to microbubbles, it has been attempted to cause contaminated water to directly flow in a microbubble generating device to generate microbubbles from contaminated water. However, in a microbubble generating device, a supply path for supplying a gas to a mixer is generally provided with an opening that is formed in the surface of the wall that defines a liquid flow path within the mixer in such a manner that the opening is perpendicular to the direction of the liquid flow. Therefore, when contaminated water is caused to directly flow in a microbubble-generating device, contaminants get stuck, in particular, in the vicinity of the exit of the supply path for supplying a gas, which undesirably causes the microbubble generating device to soon become unusable.

The following has been made to solve the above problem, and provides a microbubble-generating device that is capable of generating microbubbles from contaminated water.

Solution to Problem

The microbubble generating device according to embodiments of the present invention comprises a liquid flow path through which a pressurized liquid flows, a discharge path through which generated microbubbles and a liquid are discharged, a throat part that connects the liquid flow path and the discharge path, and that has a flow path area smaller than the area of the liquid flow path or the discharge path, and a gas supply path for supplying a gas into the liquid flow path or the throat part, wherein the gas supply path has an exit end that opens toward the downstream side of the liquid flow.

In the microbubble generating device of embodiments of the present invention, the gas supply path for supplying a gas has an exit end that opens toward the downstream side of the liquid flow. Specifically, the gas supply path has a structure such that a liquid does not easily flow into the gas supply path unless the liquid flows backward. This structure does not easily allow a liquid to flow into the gas supply path in a usual liquid flow. Therefore, even when contaminant-containing contaminated water is caused to flow as a liquid, contaminants do not enter the gas supply path, thereby preventing the gas supply path from being clogged. In this way, even when contaminated water is caused to directly flow into the microbubble generating device, microbubbles are generated from the contaminated water.

The gas supply path of the microbubble-generating device may be formed as a tube. In this structure, the tube may be disposed in such a manner that the exit end opens toward the downstream side of the liquid flow. The gas supply path is thus easily provided.

In the microbubble generating device, the tube is L-shaped, and the exit end is provided at the horizontal portion of the tube. The horizontal portion is disposed parallel to the liquid flow direction, and the exit end is located within the throat part. In this structure, the tube forming the gas supply path occupies a part of the flow path area of the throat part, reducing the flow path area in the throat part. In other words, the flow path area of the throat part is easily changed by simply changing the diameter of the tube. Therefore, the flow rate of the liquid at the throat part is easily adjusted, which makes it possible to easily adjust the amount of generated microbubbles.

The contaminated water purifying system according to embodiments of the present invention comprise the microbubble generating device described above, a contaminated water tank for supplying contaminated water to the microbubble generating device, and a flotation tank for effecting flotation of microbubbles discharged from the microbubble generating device.

The microbubble generating device of the contaminated water purifying system of embodiments of the present invention is capable of generating microbubbles from contaminated water; therefore, it is possible to cause contaminated water (liquid) that flows out of the contaminated water tank to directly flow into the microbubble generating device, and to cause microbubbles discharged from the microbubble generating device to flow into the flotation tank. If a microbubble generating device that cannot generate microbubbles from contaminated water is used, contaminated water and microbubbles must each be separately caused to flow into the flotation tank. However, this is not necessary in the contaminated water purifying system of embodiments of the present invention; thus, the contaminated water purifying system can be simplified.

Advantageous Effects of Invention

The microbubble generating device according to embodiments of the present invention is capable of generating microbubbles from contaminated water.

BRIEF DESCRIPTION

Some of the embodiments will be described in detail, with reference to the following figures, wherein like designations denote like members, wherein.

DETAILED DESCRIPTION

An embodiment of a microbubble generating device 10 according to embodiments of the present invention is described below with reference to the accompanying drawings.

Figure 1:
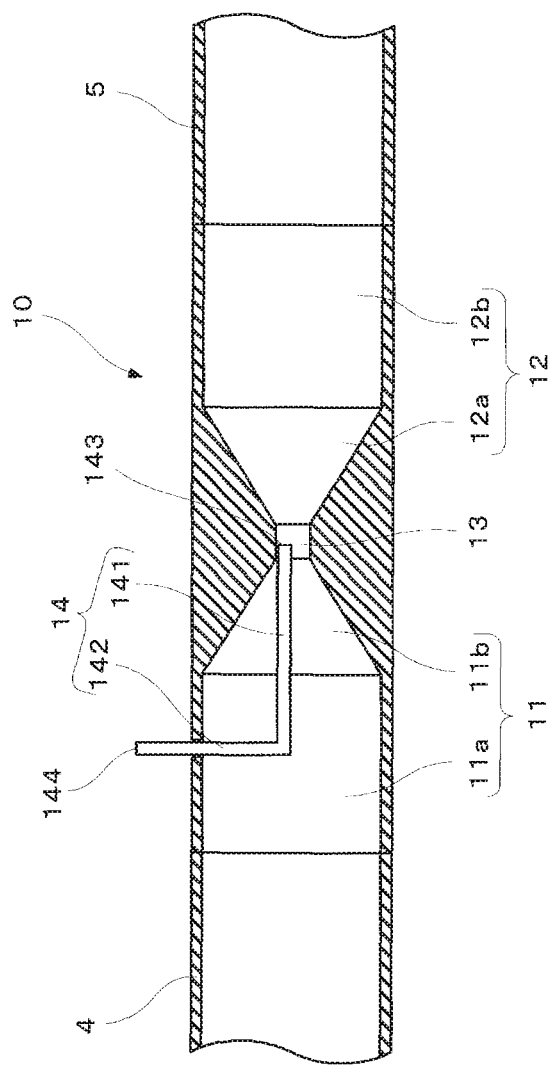
FIG. 1 is a longitudinal sectional view of the microbubble generating device according to one embodiment of the present invention.

As shown in FIG. 1, the microbubble generating device 10 comprises a liquid flow path 11 through which a pressurized liquid flows, a discharge path 12 through which generated microbubbles are discharged, and a throat part 13 that connects the liquid flow path 11 and the discharge path 12. The liquid flow path 11, the throat part 13, and the discharge path 12 are sequentially connected to form a flow path for a liquid that flows from the liquid flow path 11. The throat part 13 is of a tubular shape having a diameter smaller than that of the liquid flow path 11 or the discharge path 12, and has a flow path area smaller than that of the liquid flow path 11 or the discharge path 12. The liquid flow path 11 is formed of a tubular portion 11a having a diameter greater than that of the throat part 13, and a truncated cone portion 11b, which has a diameter that is gradually reduced toward the throat part 13, i.e., which becomes thinner toward the throat part 13. The discharge path 12 is formed of a truncated cone portion 12a, which has a diameter that is gradually increased to a large diameter from the throat part 13, i.e., which becomes thicker from the throat part 13, and a tubular shape portion 12b, which has the large diameter.

Figure 2:
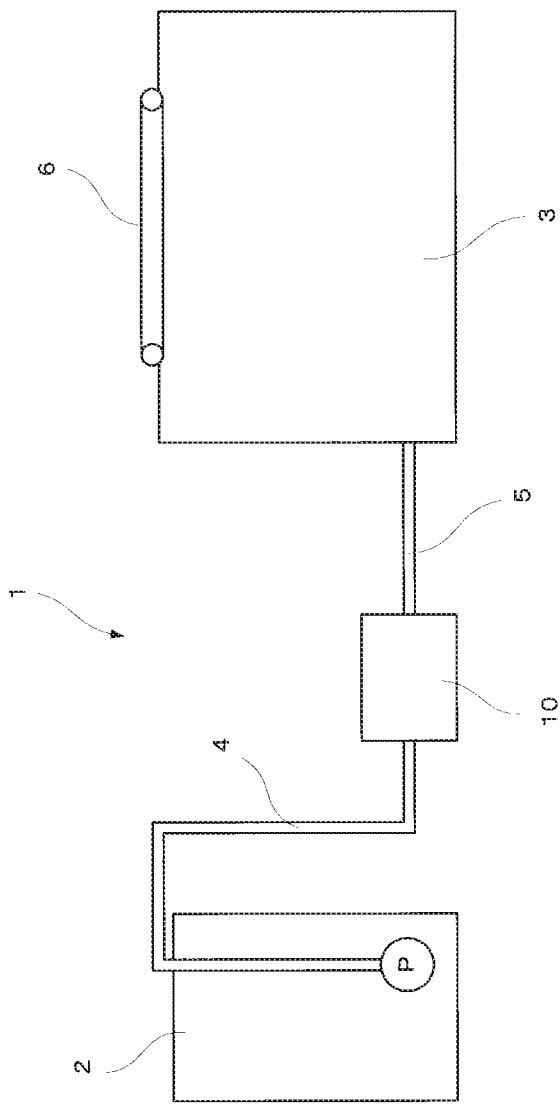
FIG. 2 is a schematic view of the contaminated water purifying system according to one embodiment of the present invention.

The end of the liquid flow path 11 on the side opposite to the throat part 13 side is connected to a first pipeline 4 for delivering a liquid to the liquid flow path 11 from a liquid storage tank, such as a contaminated water tank 2 shown in FIG. 2. Further, the end of the discharge path 12 on the side opposite to the throat part 13 side is connected to a second pipeline 5 for delivering microbubbles to a tank, such as a flotation tank 3 shown in FIG. 2, for discharging microbubbles generated by the microbubble generating device 10.

The microbubble generating device 10 further comprises a gas supply path 14 for supplying a gas into the liquid flow path 11 or the throat part 13. The gas supply path 14 is formed as a tube. This tube is L-shaped and formed of a horizontal portion 141 and a vertical portion 142, which is vertically provided from one end of the horizontal portion 141. The other end of the horizontal portion 141 serves as an exit end 143 for discharging a gas, and the other end of the vertical portion 142 not connected to the horizontal portion 141 serves as an inlet end 144, into which a gas is injected.

The gas supply path 14 is inserted from an opening formed in the surface of the wall defining the liquid flow path 11. The exit end 143 is located within the throat part 13, and the horizontal portion 141 is disposed parallel to the liquid flow. At this time, the horizontal portion 141 is preferably located in close contact with the surface of the wall defining the throat part 13.

The following describes a method for generating microbubbles by using the thus-formed microbubble generating device 10. First, a liquid pressurized by a known pump is caused to flow from a liquid storage tank into the liquid flow path 11 through the first pipeline 4. At the same time, a gas is supplied to the throat part 13 from the gas supply path 14. Since the static pressure inside the throat part 13 is relatively negative, the gas is naturally drawn into the throat part 13 through the gas supply path 14 without particularly requiring a gas supply device or the like. The liquid that flows through the throat part 13 is pressurized to a high pressure, which causes the gas supplied to the throat part 13 to dissolve in the liquid. The liquid in which the gas is dissolved then flows into the discharge path 12 from the throat part 13. The flow path area of the discharge path 12 is greater than that of the throat part 13, and the pressure of the pressurized liquid is thus reduced, causing the gas dissolving in the liquid to become supersaturated. Then, the gas that is no longer being dissolved in the liquid becomes microbubbles, and in this manner, microbubbles are generated.

The following describes, with reference to FIG. 2, one embodiment of a contaminated water purifying system 1 using the microbubble generating device 10, according to embodiments of the present invention. A contaminated water purifying system 1 comprises a microbubble generating device 10, a contaminated water tank 2 for supplying contaminated water to the microbubble generating device 10, and a flotation tank 3 for effecting flotation of microbubbles discharged from the microbubble generating device 10.

The contaminated water purifying system 1 purifies contaminated water as follows. Specifically, contaminant-containing contaminated water in the contaminated water tank 2 is pumped out of the contaminated water tank 2 with a pump and caused to flow into the microbubble generating device 10 through the first pipeline 4. In this process, the contaminated water is pressurized with a pump and caused to flow in the microbubble device 10 in a state of high pressure. Then, in the liquid that is caused to flow in, microbubbles are generated by the method for generating microbubbles by using the microbubble generating device 10, as described above.

The generated microbubbles are negatively charged, and positively charged contaminants contained in the contaminated water thus adhere to the microbubbles when passing through the discharge path 12 of the microbubble generating device 10. The microbubbles to which the contaminants adhere are delivered to the flotation tank 3 through the second pipeline 5, together with the liquid from which the contaminants have been removed.

The microbubbles that reach the flotation tank 3 start to rise with contaminants adhered thereto within the flotation tank 3 due to the rising property of microbubbles. The microbubbles then disappear in the process of rising, and only the contaminants stay at the upper part of the flotation tank 3. Since the microbubbles rise one after another, the contaminants staying at the upper part of the flotation tank 3 remain at the upper part of the flotation tank 3. After the contaminants are separated by flotation in this manner, the floating and accumulated contaminants are scooped up with a scraper 6 provided at the upper part of the flotation tank 3, and collected. In this manner, the contaminants are removed, and the contaminated water is purified.

As described above, in this embodiment, the gas supply path 14 is formed as an L-shaped tube, and the exit end 143 of the horizontal portion 141 is disposed in the direction of the downstream side of the liquid flow. In this structure, a liquid cannot flow into the gas supply path 14 unless the liquid flows backwards, making it difficult for a liquid to flow into the gas supply path 14. Therefore, even when contaminant-containing contaminated water is caused to flow in as a liquid, contaminants do not enter the gas supply path 14, and the gas supply path 14 is thus prevented from being clogged. Therefore, even when contaminated water is caused to directly flow into the microbubble generating device 10, microbubbles are generated from the contaminated water.

In this embodiment, the tube forming the gas supply path 14 is disposed such that the exit end 143 is located at the throat part 13, and the horizontal portion 141 is disposed parallel to the liquid flow. Specifically, the tube forming the gas supply path 14 occupies a part of the flow path area of the throat part 13. The amount of generated microbubbles generally varies according to the size of the flow path area of the throat part 13. In the above structure, the flow path area of the throat part 13 is easily changed by simply changing the diameter of the tube forming the gas supply path 14. It is thus possible to easily adjust the amount of generated microbubbles.

Further, the microbubble generating device 10 of the contaminated water-purifying system 1 according to this embodiment is capable of generating microbubbles from contaminated water; therefore, it is possible to cause contaminated water that flows out of the contaminated water tank 2 to directly flow into the microbubble generating device 10, and cause microbubbles discharged from the microbubble generating device 10 to flow into the flotation tank 3. If a known microbubble generating device that cannot generate microbubbles from contaminated water is used, contaminated water and microbubbles must each be separately caused to flow into the flotation tank. However, this is not necessary in the contaminated water purifying system 1 according to this embodiment, and the contaminated water purifying system 1 can thus be simplified. Moreover, since microbubbles are generated from contaminated water, the contaminants in contaminated water soon adhere to the generated microbubbles. In this manner, contaminants more efficiently adhere to microbubbles, improving the contaminant removal rate, compared to a known case in which contaminated water and microbubbles each separately flow into a flotation tank, followed by allowing the contaminants to adhere to microbubbles.

Figure 3:
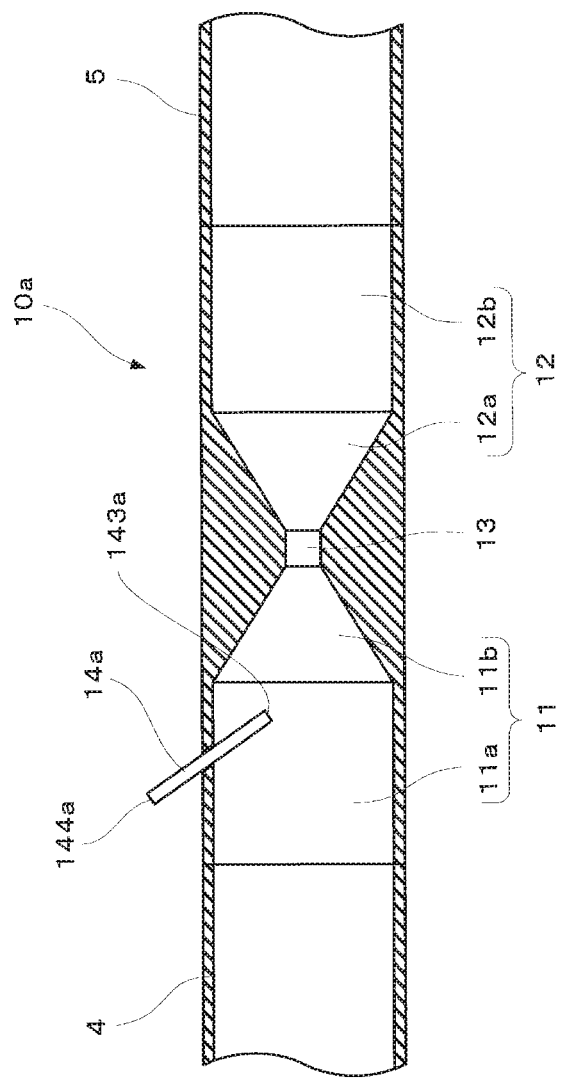
FIG. 3 is a longitudinal sectional view of the microbubble generating device according to another embodiment of the present invention.
Figure 4:
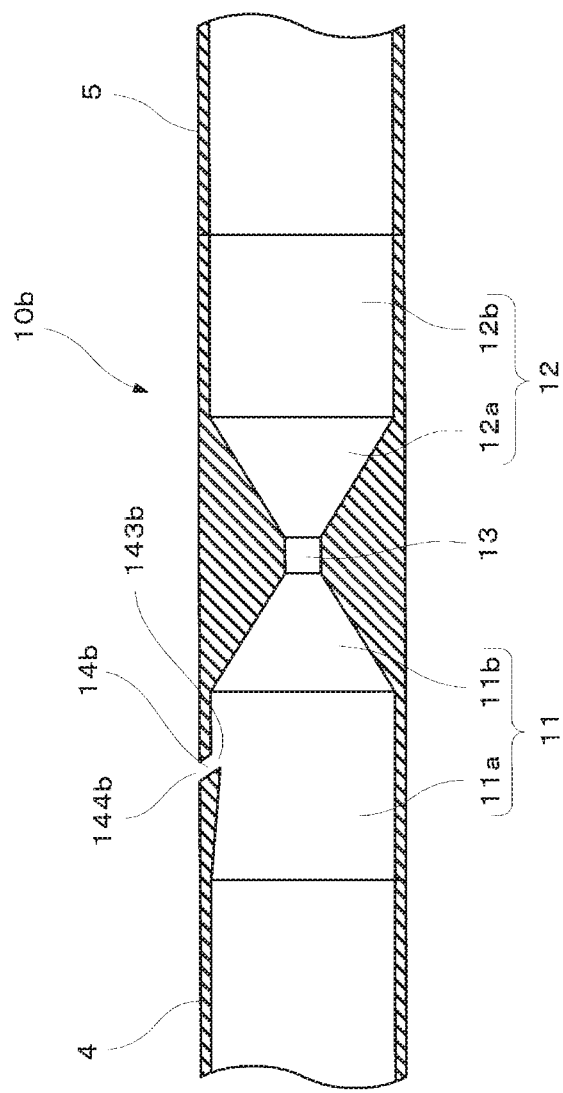
FIG. 4 is a longitudinal sectional view of the microbubble generating device according to another embodiment of the present invention.

The above describes one embodiment of the present invention. However, embodiments of the present invention are not limited to this embodiment, and various modifications are possible without departing from the spirit of embodiments of the present invention. For example, in the above embodiment, the gas supply path 14 is an L-shaped tube; however, the shape of the tube is not limited to an L-shape. For example, as shown in FIG. 3, the gas supply path 14a may be formed as a straight tube and mounted with an inclination with respect to the microbubble generating device 10a, in such a manner that the exit end 143a is in the direction of the downstream side of the liquid flow. Further, the gas supply path 14 is not necessarily formed as a tube, and as shown in FIG. 4, the gas supply path 14b may be provided as an opening formed on the surface of the wall defining the liquid flow path 11 of the microbubble generating device 10b, in such a manner that the exit end 143b is in the direction of the downstream side of the liquid flow. It is also possible to form this opening at the throat part 13. Whichever the case is, it is sufficient as long as the exit end 143a, 143b of the gas supply path 14a, 14b opens toward the downstream side of the liquid flow. If the above structure with the use of the gas supply path 14a, 14b is employed, an L-shaped tube is not required, nor is a tube even required. This simplifies the production of the microbubble generating device 10a, 10b.

The contaminated water purifying system of embodiments of the present invention may also be used, for example, to separate tritium by flotation from contaminated water containing tritium (tritiated hydrogen). Further, the microbubble generating device of embodiments of the present invention may also be used to produce carbon dioxide gas-containing water or carbon dioxide gas-containing fluid fertilizer for hydroponic culture use, or an emulsion fuel. The following is a specific description. Water or a fluid fertilizer is supplied from the liquid flow path of the microbubble generating device, and carbon dioxide gas is supplied from the gas supply path, and in this manner, carbon dioxide gas-containing water or fluid fertilizer is produced. When this water or fluid fertilizer is supplied to a hydroponic culture, the carbon dioxide gas evaporates from the water or fluid fertilizer supplied to the plant root, and the carbon dioxide gas is brought into direct contact with the stomata on the back side of plant leaves. This allows plants having properties of absorbing carbon dioxide gas to efficiently absorb carbon dioxide gas from the stomata on the back side of a leaf. Further, when water and oil are supplied from the liquid flow path of the microbubble generating device, the water is dispersed in the oil, thus producing an emulsion fuel. In this way, emulsion fuels are easily produced without using a surfactant that has previously been used to produce emulsion fuels.

EXPLANATION OF REFERENCE NUMERALS

1. Contaminated Water Purifying System
2. Contaminated Water Tank
3. Flotation Tank
10. Microbubble Generating Device
11. Liquid Flow Path
12. Discharge Path
13. Throat part
14. Gas Supply Path
141. Horizontal Portion
143. Exit End

The invention claimed is:
1. A microbubble generating device comprising:
a liquid flow path through which a pressurized liquid flows;
a discharge path through which generated microbubbles are discharged;

a throat part that connects the liquid flow path and the discharge path, and that has a flow path area smaller than an area of the liquid flow path or the discharge path; and a gas supply path for supplying a gas, wherein the gas supply path has an exit end that opens toward a downstream side of the liquid flow, and that is located at the throat part that has a smallest flow path area, and wherein an end of a horizontal portion of the gas supply path that defines the exit end is located in direct contact with a surface of a wall defining the throat part;

wherein the gas supply path is formed as a tube, the tube being L-shaped, and the exit end is provided at a horizontal portion of the tube, and wherein the horizontal portion is disposed parallel to the liquid flow direction, and the exit end is located within the throat part.

2. A contaminated water purifying system comprising:

the microbubble generating device of claim 1;

a contaminated water tank for supplying contaminated water to the microbubble generating device; and a flotation tank for effecting flotation of microbubbles discharged from the microbubble generating device.

* * * * *